(12) United States Patent
Kwak et al.

(10) Patent No.: US 9,100,334 B1
(45) Date of Patent: Aug. 4, 2015

(54) METHOD AND SYSTEM FOR VARIABLE LENGTH TAG PROCESSING

(71) Applicant: QLOGIC, Corporation, Aliso Viejo, CA (US)

(72) Inventors: David T. Kwak, Newport Coast, CA (US); Ali A. Khwaja, Irvine, CA (US); Frank Palumbo, Chino Hills, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 146 days.

(21) Appl. No.: 13/852,885

(22) Filed: Mar. 28, 2013

Related U.S. Application Data (60) Provisional application No. 61/719,160, filed on Oct. 26, 2012.

(51) Int. Cl.
*H04L 12/46* (2006.01)
*H04L 12/805* (2013.01)

(52) U.S. Cl.
CPC .................................... *H04L 47/365* (2013.01)

(58) Field of Classification Search
CPC ..................... H04L 29/06102; H04L 29/0653; H04L 49/3009; H04L 49/309; H04L 12/4645–12/4666
USPC .................................. 370/471, 474, 389, 392
See application file for complete search history.

(56) References Cited

U.S. PATENT DOCUMENTS

| 2002/0057713 | A1* | 5/2002 | Bagchi et al. | 370/468 |
| 2006/0104268 | A1* | 5/2006 | Lee et al. | 370/389 |
| 2008/0056300 | A1* | 3/2008 | Williams | 370/466 |
| 2008/0320162 | A1* | 12/2008 | Thaler | 709/236 |
| 2013/0003739 | A1* | 1/2013 | Raman et al. | 370/392 |

* cited by examiner

*Primary Examiner* — Pao Sinkantarakorn
*Assistant Examiner* — Stephen Steiner
(74) *Attorney, Agent, or Firm* — Klein, O'Neill & Singh, LLP (57) ABSTRACT

Machine implemented method and system for processing frames received by a network device from another network device via a network link are provided. The network device is configured to maintain a data structure to determine a tag size of a tag received in a frame header of a frame received by the network device; determine if the tag size is less than a fixed programmable size; insert a blank character to increase the tag size to the programmable size; and process the frame with the tag having the programmable size.

17 Claims, 5 Drawing Sheets

METHOD AND SYSTEM FOR VARIABLE LENGTH TAG PROCESSING

CROSS REFERENCE TO RELATED APPLICATIONS

This patent application claims the benefit under 35 U.S.C. §119(e) of U.S. Provisional Application Ser. No. 61/719,160, filed on Oct. 26, 2012, the disclosure of which is incorporated herein in its entirety.

TECHNICAL FIELD

The present invention relates to networks and network devices.

BACKGROUND

A computer network, often referred to simply as a network, is a group of interconnected computing devices that facilitates communication among users and allows users to share resources, for example, storage space at storage devices using a storage area network (SAN). Adapters, switches, and routers (jointly referred to as network devices) may be used to interconnect computing systems, storage devices and others. The network devices send and receive information and continuous efforts are being made to improve network communication.

SUMMARY

The various present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a machine implemented method for processing frames received by a network device from another network device via a network link is provided. The method includes determining if a tag size for a tag in a received frame is less than a programmable size; inserting a blank character to increase the tag size to the programmable size; and processing the frame with the tag having the programmable size.

In another embodiment, a machine implemented method for processing frames received by a network device from another network device via a network link is provided. The method includes maintaining a data structure to determine a tag size of a tag received in a frame header of a frame received by the network device; determining if the tag size is less than a fixed programmable size; inserting a blank character to increase the tag size to the programmable size; and processing the frame with the tag having the programmable size.

In yet another embodiment, a system having a network device communicating with another device via a network connection is provided. The network device is configured to maintain a data structure to determine a tag size of a tag received in a frame header of a frame received by the network device; determine if the tag size is less than a fixed programmable size; insert a blank character to increase the tag size to the programmable size; and process the frame with the tag having the programmable size.

This brief summary has been provided so that the nature of the disclosure may be quickly understood. A more complete understanding of the disclosure can be obtained by reference to the following detailed description of the various embodiments thereof concerning the attached drawings

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

Figure 1A:
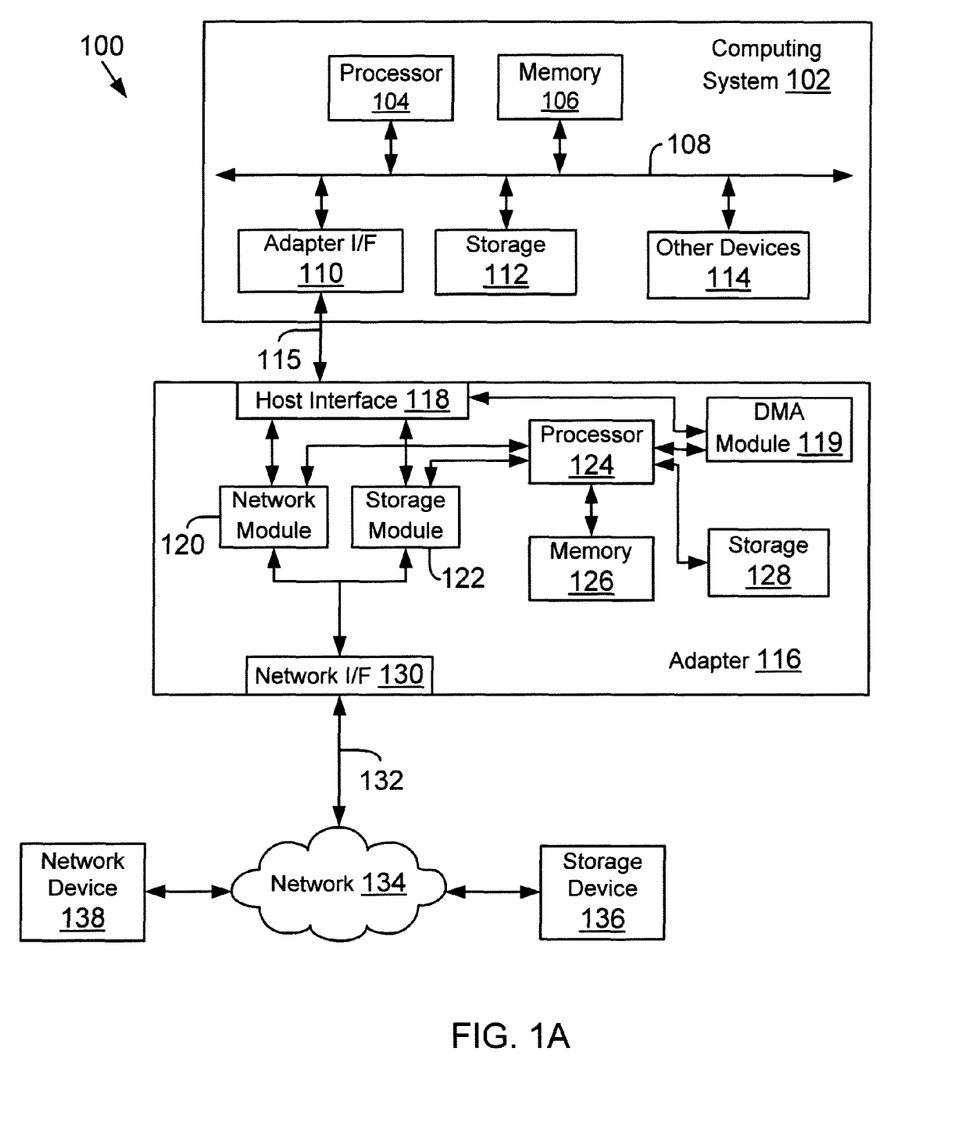
FIG. 1A is a functional block diagram of a computing system coupled to a network through an adapter.

FIG. 1A is a block diagram of a system 100 configured for use with the present embodiments. The system 100 may include one or more computing system 102 (may also be referred to as "host system 102") coupled to another device via a link 115, for example, an adapter 116 that interfaces with a network 134. The network 134 may include, for example, additional computing systems, servers, storage systems, etc. It is noteworthy that although the description below is based on the interaction between adapter 116 and host system 102, the embodiments disclosed herein are not limited to any particular adapter type or device type.

The computing system 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 104 executes computer-executable process steps and interfaces with an interconnect (or computer bus) 108. The computer bus 108 may be, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

An adapter interface 110 interfaces with the adapter 116 via the link 115 for sending and receiving information to and from adapter 116. Link 115 may be an interconnect system, for example, a PCIe (PCI-Express) bus. The computing system 102 also includes other devices and interfaces 114, which may include a display device interface, a keyboard interface, a pointing device interface, etc. Details regarding the other devices 114 are not germane to the embodiments disclosed herein.

The computing system 102 may further include a storage device 112, which may be for example a hard disk, a CD-ROM, a non-volatile memory device (flash or memory stick) or any other mass storage device. Storage device 112 may store operating system program files, application program files, and other files. Some of these files are stored at storage device 112 using an installation program. For example, the processor 104 may execute computer-executable process steps of an installation program so that the processor 104 can properly execute the application program.

Memory 106 also interfaces to the computer bus 108 to provide the processor 104 with access to memory storage. Memory 106 may include random access main memory (RAM). When executing stored computer-executable process steps from storage device 112, the processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, link 115 and the adapter interface 110 couple the adapter 116 to the computing system 102. The adapter 116 may be configured to handle both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 Gbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common technology used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. The adapter 116 shown in FIG. 1A may be configured to operate as an FCOE adapter and may be referred to as FCOE adapter 116. QLogic Corporation, the assignee of the present application, provides one such adapter. The illustrated adapter 116, however, does not limit the scope of the present embodiments. The present embodiments may be practiced with adapters having different configurations.

Previously Ethernet standard allowed a 4 byte tag called VLAN (or Qtag) to be inserted in an Ethernet frame, which is 4 bytes in length. The FCOE standard however, allows inclusion of multiple tags with variable lengths from 4 bytes to 16 bytes. The variable length field of Ethernet tags throws off the position of subsequent frame fields including FCOE and Fibre Channel frame headers. This makes it difficult to parse frames that are received by adapter 116 components. The embodiments disclosed herein provide a method and system for handling variable length tags and modifying the tag size by adding blank or idle character such that the various components of adapter 116 receive a same size tag for processing frames. This allows the hardware components to detect the frame headers easily and improves overall frame processing, as described below in detail.

Referring back to FIG. 1A, adapter 116 interfaces with the computing system 102 via the link 115 and a host interface 118. In one embodiment, the host interface 118 may be a PCI Express interface having logic/circuitry for sending and receiving PCI-Express packets described below in detail.

The adapter 116 may also include a processor (or more than one processor) 124 that executes firmware instructions out of a memory 126 to control overall adapter operations. The adapter 116 may also include storage 128, which may be for example, a non-volatile memory, such as flash memory, or any other device. The storage 128 may store executable instructions and operating parameters that can be used for controlling adapter operations.

The adapter 116 includes a network module 120 for handling network traffic via a link 132. In one embodiment, the network module 120 includes logic and circuitry for handling network packets, for example, Ethernet or any other type of network packets. The network module 120 may include memory buffers (not shown) to temporarily store information received from other network devices 138 and transmitted to other network devices 138.

The adapter 116 may also include a storage module 122 for handling storage traffic to and from storage devices 136. The storage module 122 may further include memory buffers (not shown) to temporarily store information received from the storage devices 136 and transmitted by the adapter 116 to the storage devices 136. In one embodiment, the storage module 122 is configured to process storage traffic according to the Fibre Channel storage protocol, or any other protocol. It is noteworthy that adapter 116 may only have a network module 120 or a storage module 122. The embodiments described herein are not limited to any particular adapter type.

The adapter 116 also includes a network interface 130 that interfaces with link 132 via one or more ports (not shown). The network interface 130 includes logic and circuitry to receive information via the network link 132 and pass it to either the network module 120 or the storage module 122, depending on the packet type.

Adapter 116 also includes a direct memory access (DMA) module 119 that is used to manage access to link 115. The DMA module 119 uses a plurality of DMA channels (not shown) for transferring data via link 115. The DMA channels are typically used to move control structures such as input/output control blocks (IOCBs), input/output status blocks (IOSBs) and data between host system memory 106 and the adapter memory 126.

Figure 1B:
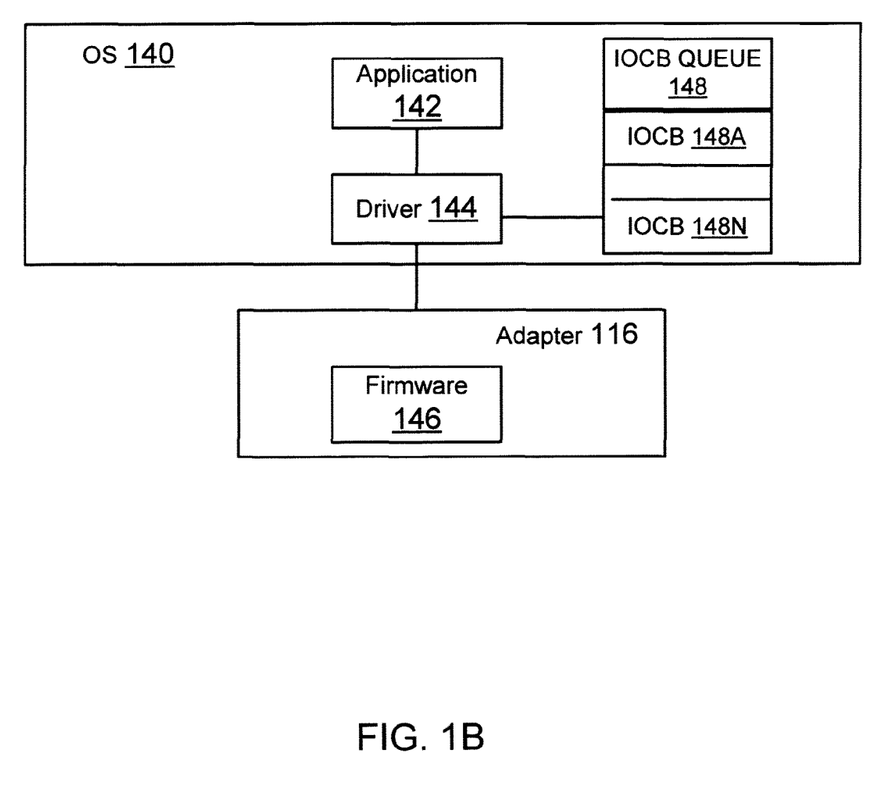
FIG. 1B shows a block diagram of a generic architecture used by the system of FIG. 1A.

FIG. 1B shows an example of a generic software architecture used by system 100. Processor 104 executes an operating system 140 for controlling the overall operations of computing system 102. The operating system may be Windows based, Linux operating system, Solaris, or any other operating system type. The embodiments disclosed herein are not limited to any particular operating system type.

An application 142 may be executed by processor 104 for performing certain functions. For example, application 142 may be an email program, a database application or any other application type. Application 142 may send a command to a driver 144 for performing an operation, for example, reading and/or writing data (input/output (I/O) at another storage device. The driver 144 processes the request and communicates with firmware 146 executed by processor 124 of adapter 116. A component of adapter 116 then processes the request.

Typically for managing data transfers across link 115, an IOCB is generated by the driver 144 and saved at an IOCB queue 148, shown as 148A-148N. The IOCB queue 148 may be at host memory 106 or any other location. The IOCB may be to provide data to host processor 104, to send data provided by host processor 104 or to obtain status information. The IOCB is obtained and processed by adapter 116.

Figure 1C:
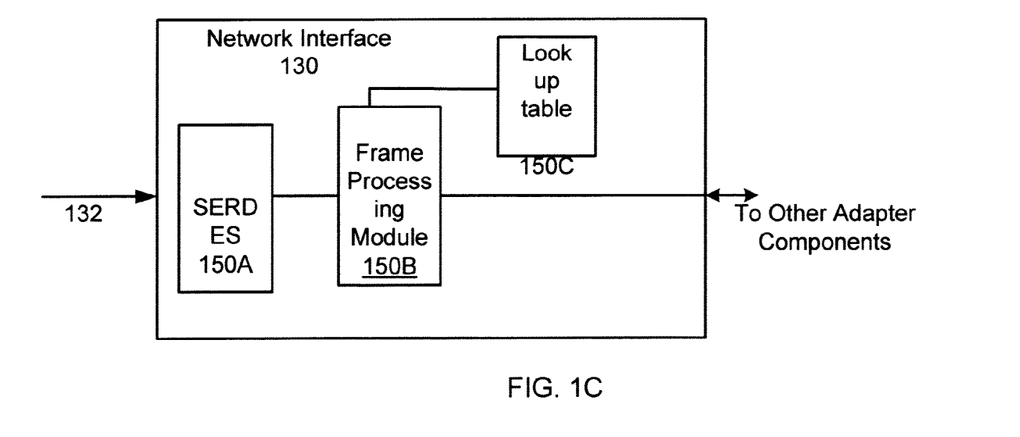
FIG. 1C shows an example of network interface 130 used for communication, according to one embodiment.

FIG. 1C shows a block diagram of network interface block 130 of adapter 116, according to one embodiment. The network adapter 130 includes a serial/de-serializer (SERDES) 150A that receives serial data (i.e. frames, packets or any other information type) from network link 132 and converts it to parallel data and vice-versa.

The network interface module 130 includes a frame processing module 150B that receives frames from network link 132. The frame processing module 150B detects an Ether Type from a frame header of the received frames, as described below in detail. The frame processing module 150B maintains a look-up table (or any other data structure) 150C. The look-up table 150C stores an Ether Type and the tag size associated with the Ether Type.

The frame processing module 150B detects the Ether Type of every received frame. Ether Type is a two-octet field in an Ethernet frame (or FCoE frame). It is used to indicate which protocol is encapsulated in the payload of an Ethernet Frame. Ether Type numbering generally starts from 0x0800. The Ether Type value may be determined from a received frame header, as described below in detail.

The frame processing module 150B obtains the tag size associated with the detected Ether Type from the look up table 150C. If the tag size is less than a programmed size, for example, 20 bytes, then the frame processing module 150B inserts blank characters (or idle characters) so that the tag size becomes equal to the programmed size. This allows adapter 116 logic to parse and process frames with tags having the programmed fixed size, even though different tags of different sizes are received by the network interface module 130.

The programmable tag size may be stored as part of adapter 116 configuration information in a data structure at memory 126 and/or storage 128. The programmable tag size may be stored during a configuration operation using a management application (not shown).

The following shows an example of the entries in look up table 150C. The first column from the left is to enable a certain Ether Type. The second column shows the tag length associated with each Ether Type shown in the third column.

| Enable Bit [20] | Tag Length in double bytes [19:16] | Tag Ether Type [15:0] |
|---|---|---|
| . | 4' h2 | 16' h8100 |
| . | 4' h2 | 16' h8102 |
| . | 4' h8 | 16' h8108 |

The following provides an example of tag types/Ether Types/Tag length that can be handled as fixed length tags, according to one embodiment:

| Tag Description | Programmable Tag Identifier Ether Type | Tag Length |
|---|---|---|
| VLAN Tag | 8100 | 4 bytes |
| QFC Tag | 8102 | 4 bytes |
| CN-r Tag | 8102 | 4 bytes |
| CN-t Tag | 8102 | 4 bytes |
| VNTAG | 8103 | 6 bytes |
| Undefined Tag | 8103 | 6 bytes |
| MAC Sec Tag 1 | 8104 | 8 bytes |
| MAC Sec Tag 2 | 8108 | 16 bytes |

Figure 2:
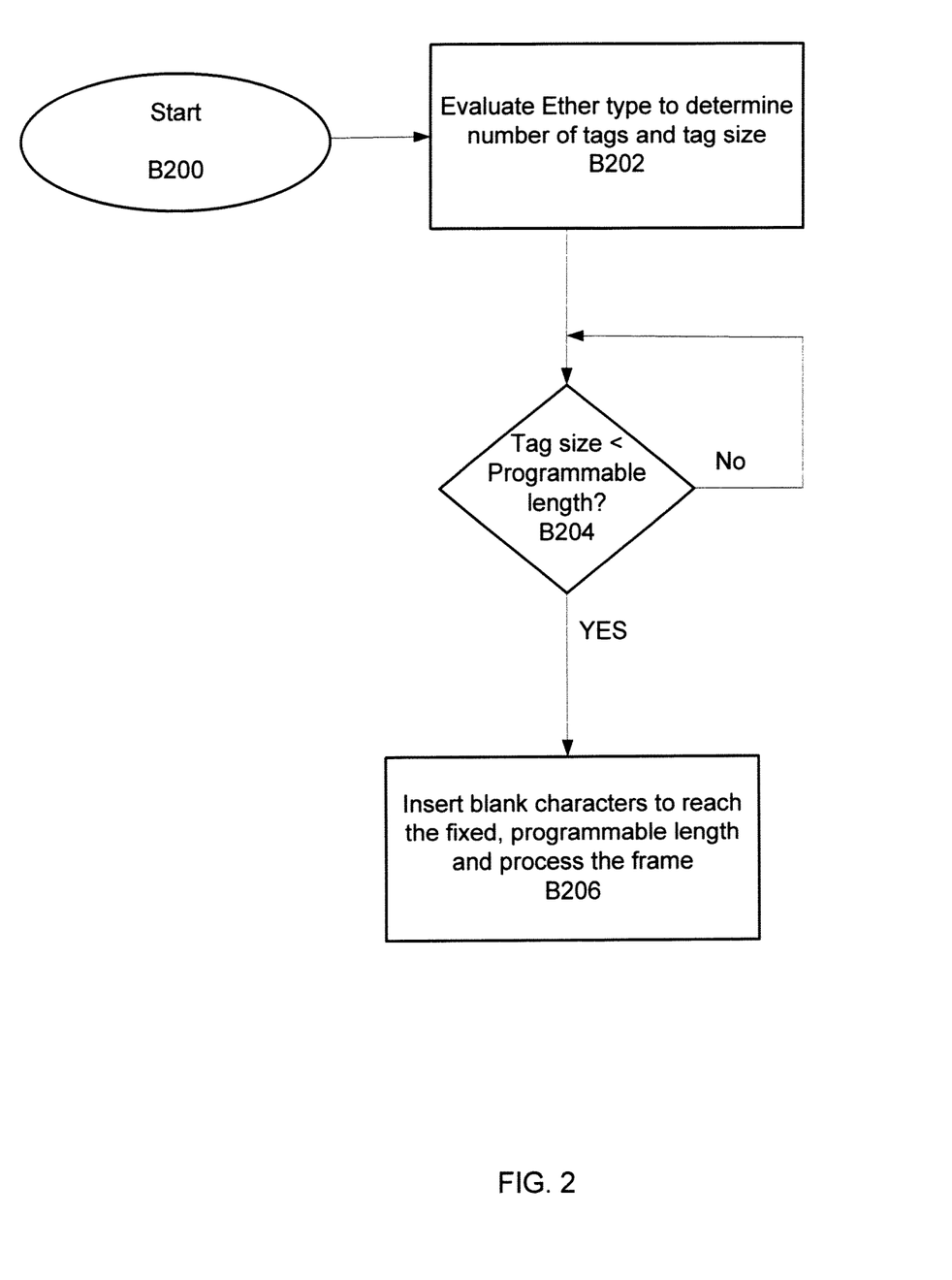
FIG. 2 shows a process flow, according to one embodiment.

FIG. 2 shows a process for managing tags that are received by network interface 130 of adapter 116. It is noteworthy that the process of FIG. 2 is not limited to an adapter but can be used by any network device. Thus the term adapter should be used in a generic and non-limiting manner.

The process begins in block B200, when a frame is received by the network interface module 130. After preprocessing, the Ether Type of the frame is detected by the frame processing module 150B or any other module from a frame header.

In block B202, the frame processing module 150B checks the look up table 150C to determine a number of tags and the tag size, for the detected Ether Type of the received frame.

In block B204, the processing module 150B determines if the tag size is less than a programmable size, for example, 20 bytes. If the tag size is less, then blanks or idle characters are inserted by the frame processing module 150B so that the tag size reaches the fixed programmable size. Thereafter, the frames with the fixed programmable tag size are processed by the various components of adapter 116. Because the tags after insertion are all of a uniform size, it makes it easier for the various components of adapter 116, for example, processor 124, network module 120 and storage module 122 to process the tags/frames.

If in block B204, the tag size for the Ether Type is equal to the programmable size, then the process simply loops back for a next frame.

The following shows an example of a tag received in a frame.

| DA | SA | VLAN Tag | QFC Tag | CN-t Tag | FCOE Header | FC Header | Data Field | FCS |
|---|---|---|---|---|---|---|---|---|

The following shows when a blank or Idle character is inserted in the frame by the frame processing module 150B so that the tags have a uniform or a programmable size, for example, 20 byte tags field:

| DA | SA | VLAN Tag | QFC Tag | CN-t Tag | Blank | FCOE Header | FC Header | Data Field | FCS |
|---|---|---|---|---|---|---|---|---|---|

Figure 3:
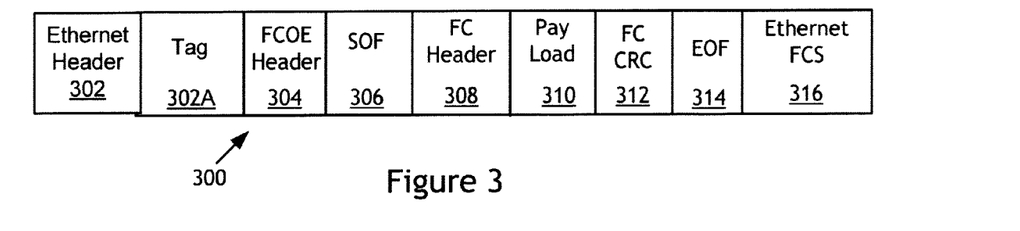
FIG. 3 shows an example of a FCoE frame format, used according to one embodiment.

FIG. 3 shows an example of an FCoE packet format 300 for processing network and storage traffic, according to the present embodiments. The FCoE packet 300 includes an Ethernet header 302. In one embodiment, the Ethernet header 302, which includes the Ethernet type, may be fourteen bytes in length, for example. The Ethernet header 302 may also include optional Tag fields (shown as tag fields 302A) that have been described above. The FCoE packet 300 also includes an FCoE header 304 that includes a number of reserved fields. A start of frame (SOF) 306 indicates the beginning of the embedded Fibre Channel frame and may be one byte, for example.

The FCoE packet 300 may also include a Fibre Channel header (FC Header) 308 that may be 24 bytes long with a payload 310. The Fibre Channel cyclic redundancy code (CRC) 312 may be 4 bytes and the Fibre Channel end of frame (EOF) 314 may be 1 byte in size. The EOF 514 indicates the end of the embedded Fibre Channel frame. The Ethernet FCS 316 is inserted after the Fibre Channel EOF 514.

The embodiments described herein efficiently process frames and tags of variable size. By evaluating the Ether Type with a data structure and then increasing the tag size to reach a fixed length, the various components of adapter 116 can uniformly process frames and tags, according to one embodiment.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. For example, the embodiments disclosed herein are applicable to any peripheral device and are not limited to any particular adapter type. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A machine implemented method for processing frames received by a network device from another network device via a network link, comprising:
   maintaining a data structure for storing a plurality of Ether Types and an associated tag size for each Ether Type;
   detecting an Ether Type of a received frame;
   obtaining a tag size for the detected Ether Type from the data structure;
   determining if the tag size for a tag in the received frame is less than a programmable size;
   inserting one or more blank characters to increase the tag to the programmable size; and
   then processing the frame with the tag having the programmable size.

2. The method of claim 1, wherein the frame processing module inserts the blank character(s) to increase the tag size to the programmable size.

3. The method of claim 1, wherein the frame is a Fibre Channel over Ethernet frame.

4. The method of claim 1, wherein the network device is an adapter.

5. The method of claim 1, wherein the programmable tag size is 20 bytes.

6. A machine implemented method for processing frames received by a network device from another network device via a network link, comprising:
   maintaining a data structure to determine a tag size of a tag received in a frame header of a frame received by the network device, wherein the data structure stores a plurality of Ether Types and an associated tag size for each Ether Type;
   detecting an Ether Type of a received frame;
   obtaining a tag size for the detected Ether Type from the data structure;
   determining if the tag size is less than a fixed programmable size;
   inserting a blank character to increase the tag size to the programmable size; and
   processing the frame with the tag having the programmable size.

7. The method of claim 6, wherein a frame processing module of a network interface module of the network device detects the Ether Type field from the frame header of the received frame and obtains a tag size for the detected Ether Type.

8. The method of claim 7, wherein the frame processing module inserts the blank character to increase the tag size to the programmable size.

9. The method of claim 6, wherein the frame is a Fibre Channel over Ethernet frame.

10. The method of claim 6, wherein the network device is an adapter.

11. The method of claim 6, wherein the programmable tag size is 20 bytes.

12. A system, comprising:
   a network device having a processor and a memory communicating with another device via a network connection;
   wherein the network device is configured to:
      maintain a data structure to determine a tag size of a tag received in a frame header of a frame received by the network device, wherein the data structure stores a plurality of Ether Types and an associated tag size for each Ether Type;

detect an Ether Type of a received frame;

obtain a tag size for the detected Ether Type from the data structure;

determine if the tag size is less than a fixed programmable size;

insert a blank character to increase the tag size to the programmable size; and process the frame with the tag having the programmable size.

13. The system of claim 12, wherein a frame processing module of a network interface module of the network device detects the Ether Type field from the frame header of the received frame and obtains a tag size for the detected Ether Type from the data structure.

14. The system of claim 13, wherein the frame processing module inserts the blank character to increase the tag size to the programmable size.

15. The system of claim 12, wherein the frame is a Fibre Channel over Ethernet frame.

16. The system of claim 12, wherein the network device is an adapter.

17. The system of claim 12, wherein the programmable tag size is 20 bytes.

* * * * *